(12) United States Patent
Chou (10) Patent No.: US 9,541,368 B2
(45) Date of Patent: Jan. 10, 2017

(54) TIRE PRESSURE GAUGE

(71) Applicant: CHIN RAY INDUSTRIAL LTD., Chiayi (TW)

(72) Inventor: Chiu-Sung Chou, Chiayi (TW)

(73) Assignee: Chin Ray Industrial Ltd., Chiayi (TW)

( * ) Notice: Subject to any disclaimer, the term of this patent is extended or adjusted under 35 U.S.C. 154(b) by 86 days.

(21) Appl. No.: 14/637,604

(22) Filed: Mar. 4, 2015

(65) Prior Publication Data

US 2016/0258735 A1    Sep. 8, 2016

(51) Int. Cl.
*G01L 17/00* (2006.01)
*G01B 5/18* (2006.01)
*G01L 19/00* (2006.01)
*G01L 19/14* (2006.01)
*G01L 19/16* (2006.01)

(52) U.S. Cl.
CPC ............... *G01B 5/18* (2013.01); *G01L 17/005* (2013.01); *G01L 19/0092* (2013.01); *G01L 19/142* (2013.01); *G01L 19/147* (2013.01); *G01L 19/16* (2013.01)

(58) Field of Classification Search
CPC .......... G01B 5/18; G01L 17/00; G01L 17/005; G01L 19/0092; G01L 19/142; G01L 19/147; G01L 19/16
See application file for complete search history.

(56) References Cited

U.S. PATENT DOCUMENTS

2006/0144135 A1*  7/2006  Chou ................... G01B 3/28
                                                                    73/146.3

* cited by examiner

*Primary Examiner* — Paul West
(74) *Attorney, Agent, or Firm* — Alan D. Kamrath; Kamrath IP Lawfirm, P.A.

(57) ABSTRACT

A tire pressure gauge contains a housing, a pressure measuring unit, and a tire-tread depth measuring unit. The tire-tread depth measuring unit includes a mounting assembly, a gear assembly, a hair spring, a covering lid, and a longitudinal post. The tire pressure gauge measures a tire pressure and a tire-tread depth. The tire-tread depth measuring unit indicates a number of the tire-tread depth by using a pointer, after a measurement stem of the longitudinal post is inserted into a tread slit of a tire, and a longitudinal movement of the longitudinal post is transformed into circumference rotation data through the gear assembly, thus indicating the number of the tire-tread depth on a numerical display panel clearly. Preferably, a probe and the measurement stem of the longitudinal post inserted into the tread slit are driven by the hair spring to return to a zero state.

3 Claims, 10 Drawing Sheets

TIRE PRESSURE GAUGE

BACKGROUND OF THE INVENTION

Field of the Invention

The present invention relates to a tire pressure gauge in which a tire-tread depth measuring unit indicates a number of the tire-tread depth by using a pointer, after a measurement stem of a longitudinal post is inserted into a tread slit of a tire, and a longitudinal movement of the longitudinal post is transformed into circumference rotation data through a gear assembly, thus indicating the number of the tire-tread depth on a numerical display panel clearly.

Description of the Prior Art

A conventional tire pressure gauge contains a mounting assembly, a driving device, an indication device, and an elastic cable. The indication device has a fixing plate and an indicating panel, and the fixing plate has an orifice defined thereon to accommodate a resilient element. The fixing plate is mounted on a position column of the mounting assembly by the resilient element. In assembly, the resilient element drives the fixing plate to push a rotary shaft, such that the rotary shaft engages with the driving device. However, the conventional tire pressure gauge can only measure a tire pressure, but cannot measure a tire-tread depth of a tire.

The present invention has arisen to mitigate and/or obviate the afore-described disadvantages.

SUMMARY OF THE INVENTION

The primary objective of the present invention is to provide a tire pressure gauge in which a tire-tread depth measuring unit indicates a number of the tire-tread depth by using a pointer, after a measurement stem of a longitudinal post is inserted into a tread slit of a tire, and a longitudinal movement of the longitudinal post is transformed into circumference rotation data through a gear assembly, thus indicating the number of the tire-tread depth on a numerical display panel clearly.

To obtain above-mentioned objectives, a tire pressure gauge provided by the present invention contains a housing in which an open accommodating chamber is defined, with the open accommodating chamber having a groove defined around an outer rim thereof relative to the housing and communicating therewith. The open accommodating chamber also has a pressure measuring unit disposed therein, and the pressure measuring unit has an air guiding device opposite to the housing. The pressure measuring unit further has a numerical display panel mounted on one end surface thereof relative to the housing, and the numerical display panel has a tire pressure displaying area and a tire-tread depth displaying area. The tire-tread depth displaying area is circular to display a tire-tread depth in a clockwise direction. The groove of the housing has a plurality of first orifices defined on two sides thereof, and the housing further includes a through hole formed on a predetermined position thereof relative to the plurality of first orifices. The groove of the housing also has a tire-tread depth measuring unit fixed thereon. The tire-tread depth measuring unit contains: a mounting assembly, a damping washer, a longitudinal post, and a covering lid.

The mounting assembly includes a holder, a seat secured on a central position thereof, a first aperture defined on one surface of the seat, a second aperture and a third aperture which are defined above the first aperture, a vertical slot formed aside the second aperture, a fourth aperture defined in the vertical slot relative to the holder, a fifth aperture arranged on a predetermined position of one side of the vertical slot, and two locking recesses defined aside two sides of a top end of the vertical slot. A gear assembly includes a first gear, a second gear, a third gear, a fourth gear, a fixing plate, a driving member, a hair spring, and a transmission shaft. The second gear has a first opening, and the fixing plate has a second opening corresponding to the first opening. A first end surface of the first opening aligns with the second opening, and a second end surface of the first opening is in alignment with the third aperture of the mounting assembly. The third gear has a first connection portion and a second connection portion which extend outwardly from two end surfaces of the third gear. The second aperture of the mounting assembly corresponds to the first connection portion. The first connection portion is coupled with the second aperture, and the fixing plate further has a third opening corresponding to the second connection portion. The second connection portion is joined with the third opening, and the second gear meshes with the third gear. The first gear has a fourth opening defined thereon. The fourth opening aligns with the second opening of the fixing plate, and the first gear meshes with the fourth gear. The fourth gear has a third connection portion extending outwardly from one end surface thereof, and the hair spring is in a spiral shape. The hair spring has a first joining segment formed adjacent to a central position thereof, and the first joining segment aligns with the third aperture of the mounting assembly. The hair spring also has a second joining segment extending outwardly opposite to the first joining segment to connect at a predetermined position of a back surface of the mounting assembly. The driving member has a first pore formed on a central position thereof to align with the first joining segment of the hair spring, and the transmission shaft inserts through the fourth opening of the first gear, the second opening of the fixing plate, the third aperture of the mounting assembly, the first joining segment of the hair spring, and the first pore of the driving member. A distal end of the transmission shaft abuts against and connects with the first gear, the fixing plate, the second gear, the hair spring, and the driving member. Hence, the first gear, the fixing plate, the second gear, the hair spring, and the driving member are driven by the transmission shaft simultaneously. The third connection portion of the fourth gear has an indication portion arranged on a central position of an outer edge thereof and fixed in the tire-tread depth displaying area of the numerical display panel.

The damping washer is mounted in the fifth aperture of the mounting assembly by inserting a first screw in the fifth aperture of the mounting assembly.

The longitudinal post is vertically connected with the vertical slot of the mounting assembly and includes a slidable rack arranged on a top end thereof. The slidable rack extends out of the through hole of the housing. The longitudinal post also includes a flat portion formed on a predetermined zone of a front end surface thereof, and the flat portion has a meshing rack fixed on one side thereof to correspond to the third gear. The meshing rack meshes with the third gear, and the longitudinal post further includes a measurement stem secured on a distal end thereof and downwardly extending out of the fourth aperture of the mounting assembly.

The covering lid includes a first ventilation aligning with the fixing plate and the first aperture of the mounting assembly. A second screw is inserted through the first ventilation to screw with the first aperture of the mounting assembly, and the covering lid also includes a second ventilation defined thereon to correspond to the third connection portion of the fourth gear. The third connection portion of the fourth gear is connected with the second ventilation of the covering lid, and the covering lid further includes two tenons formed thereon to correspond to the two locking recesses of the mounting assembly.

DETAILED DESCRIPTION OF THE PREFERRED EMBODIMENTS

The present invention will be clearer from the following description when viewed together with the accompanying drawings, which show, for purpose of illustration only, preferred embodiments in accordance with the present invention.

Figure 1:
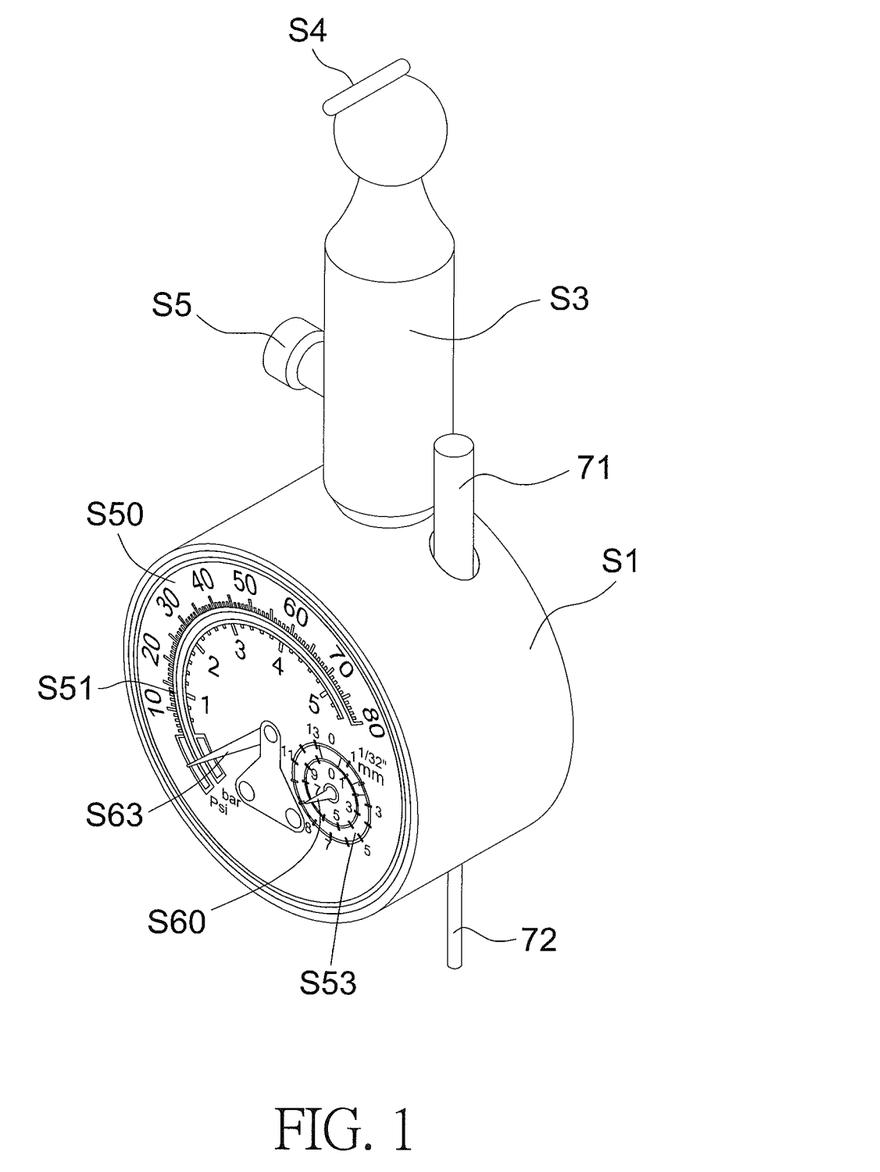
FIG. 1 is a perspective view showing the assembly of a tire pressure gauge according to a preferred embodiment of the present invention.
Figure 2:
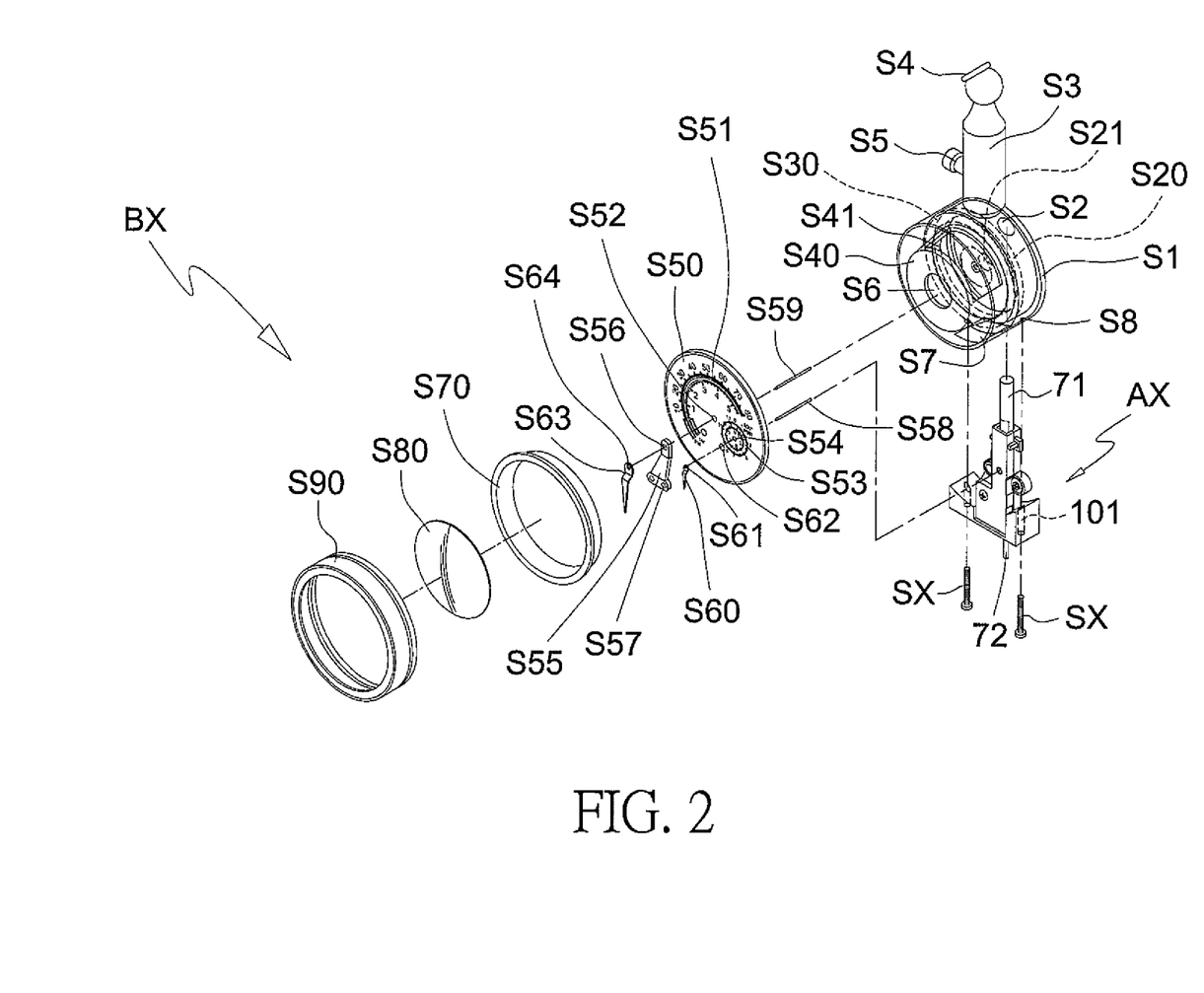
FIG. 2 is a perspective view showing the exploded components of the tire pressure gauge according to the preferred embodiment of the present invention.
Figure 3:
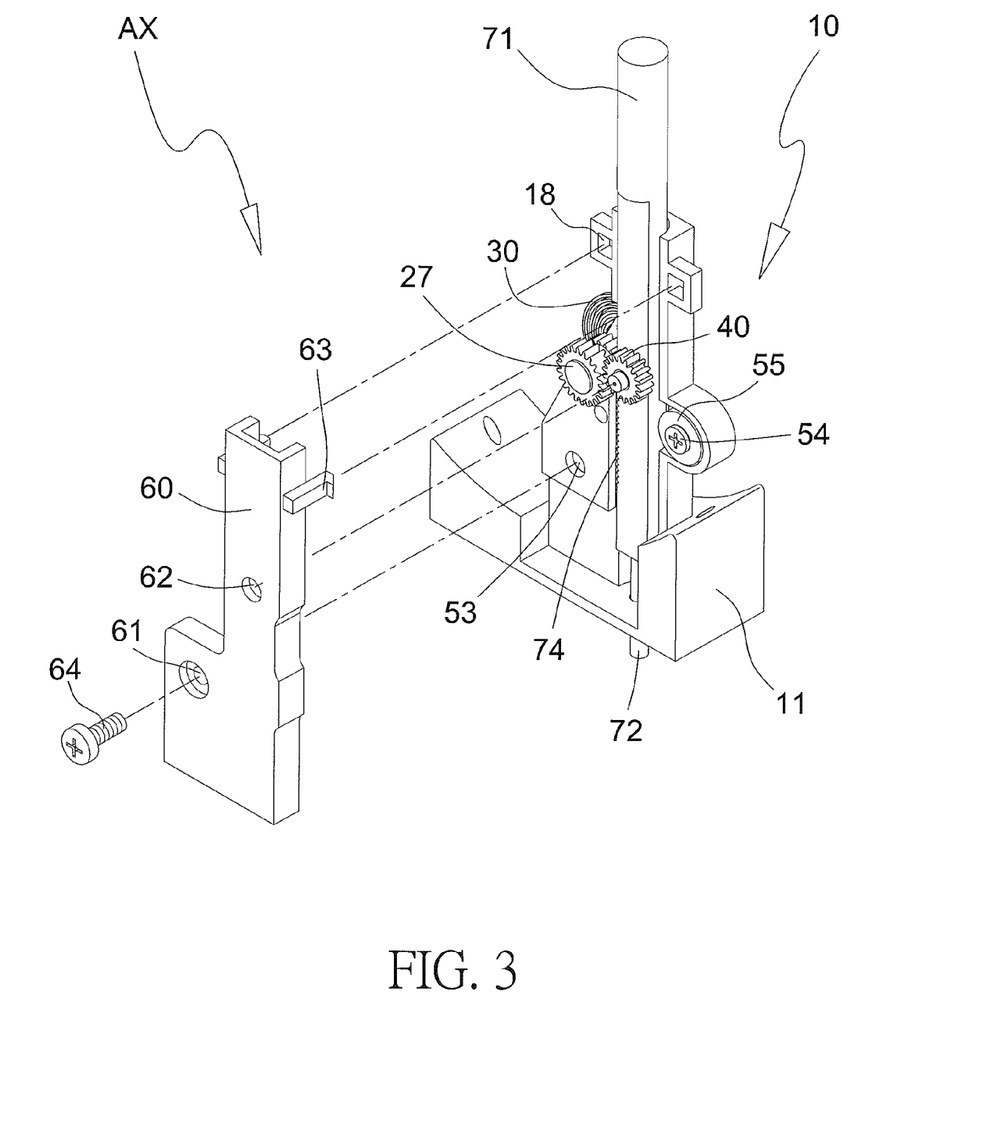
FIG. 3 is a perspective view showing the assembly of a tire-tread depth measuring unit of the tire pressure gauge according to the preferred embodiment of the present invention.
Figure 4:
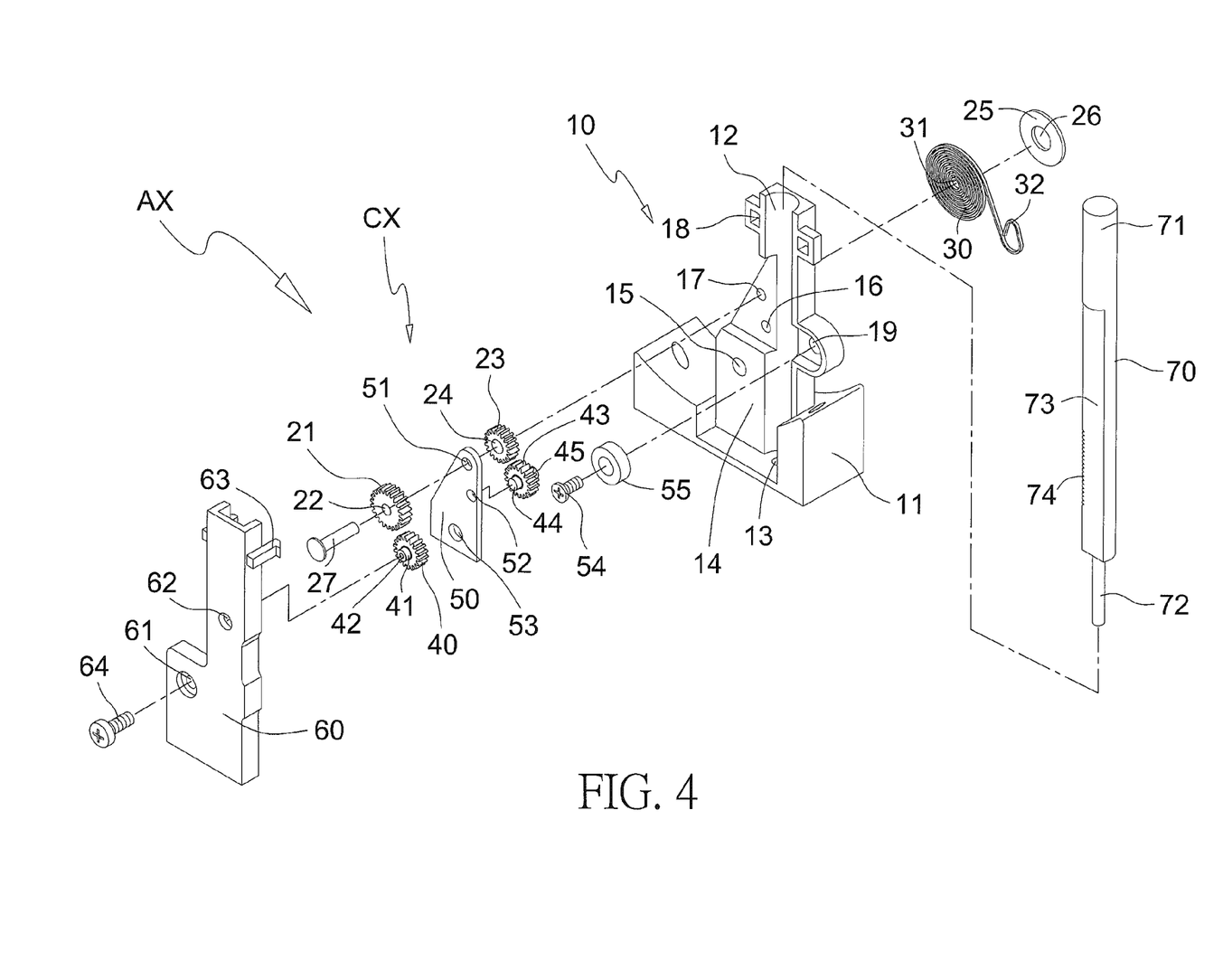
FIG. 4 is a perspective view showing the exploded components of the tire-tread depth measuring unit of the tire pressure gauge according to the preferred embodiment of the present invention.
Figure 5:
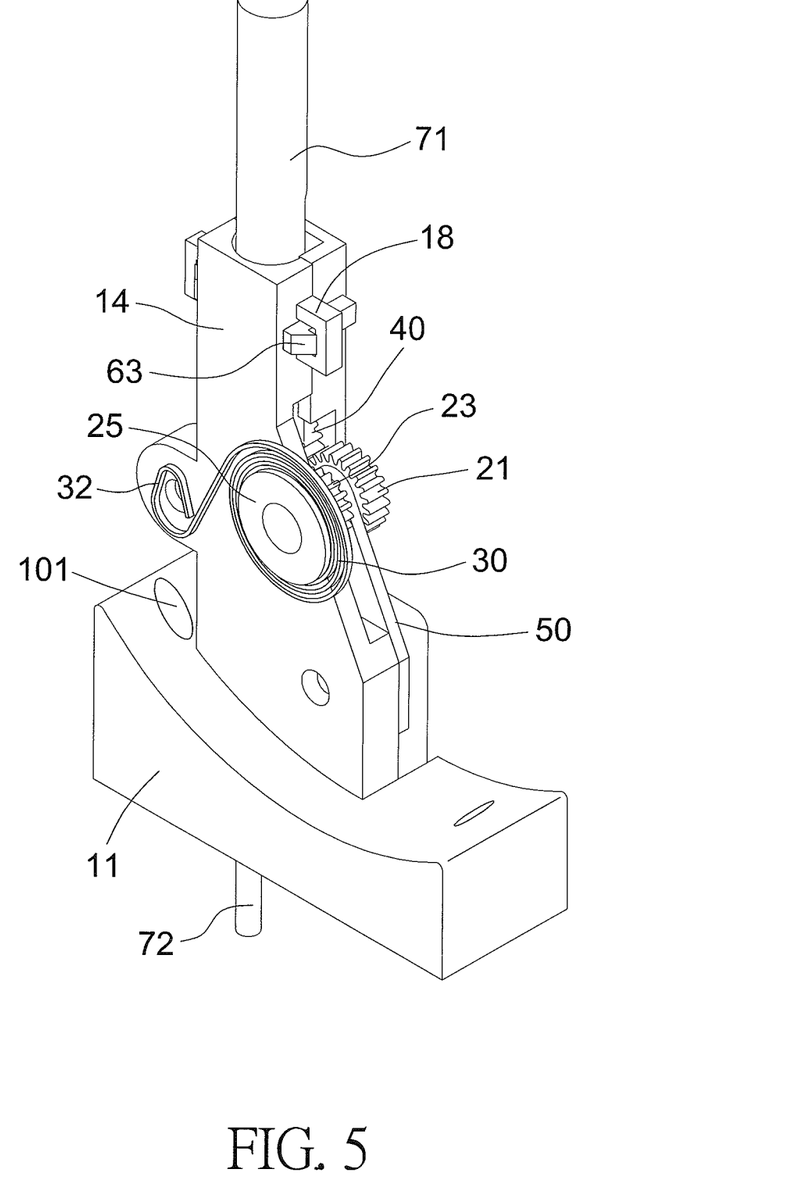
FIG. 5 is another perspective view showing the assembly of the tire-tread depth measuring unit of the tire pressure gauge according to the preferred embodiment of the present invention.
Figure 6:
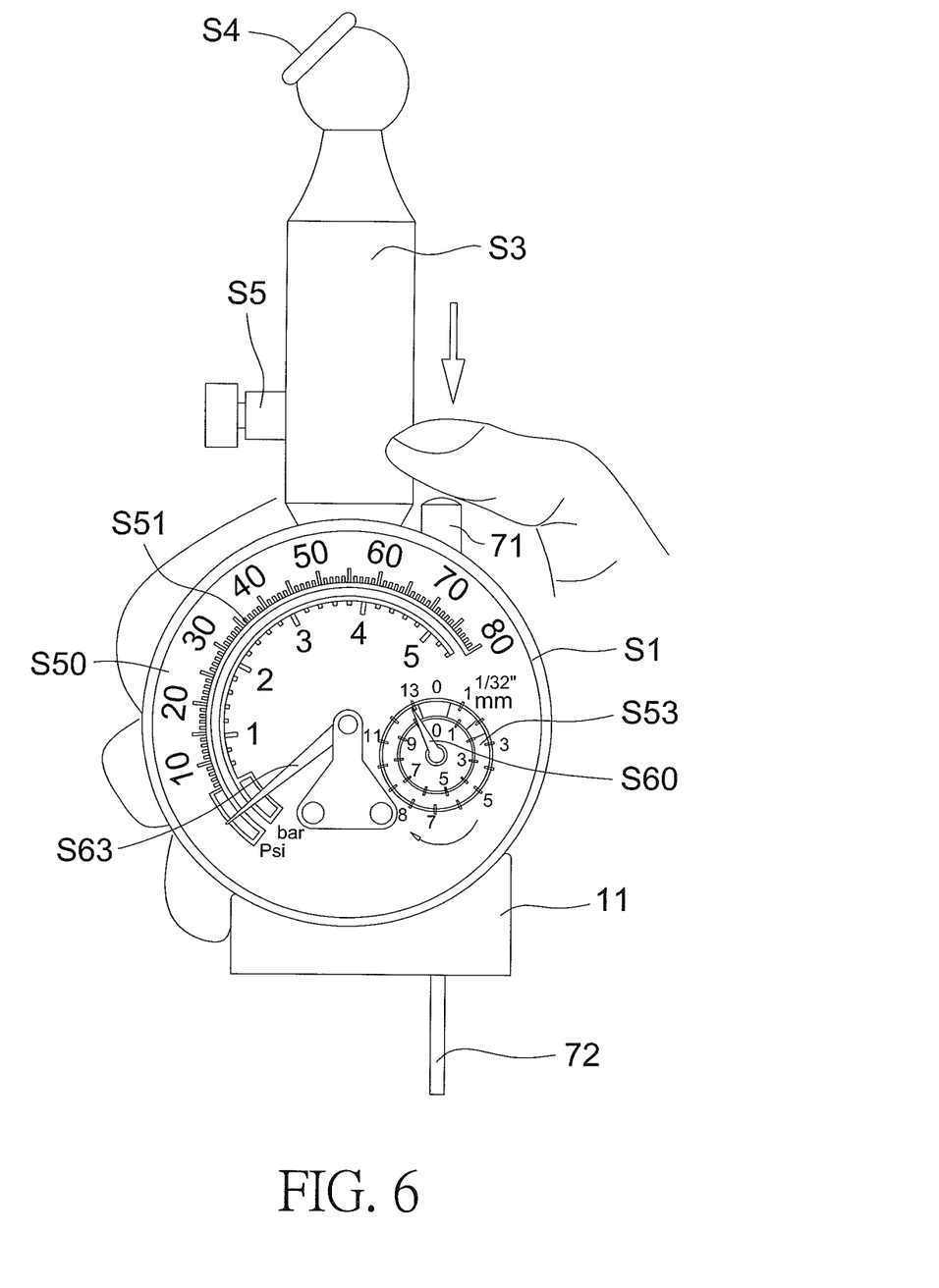
FIG. 6 is a plan side view showing the application of the tire pressure gauge according to the preferred embodiment of the present invention.
Figure 7:
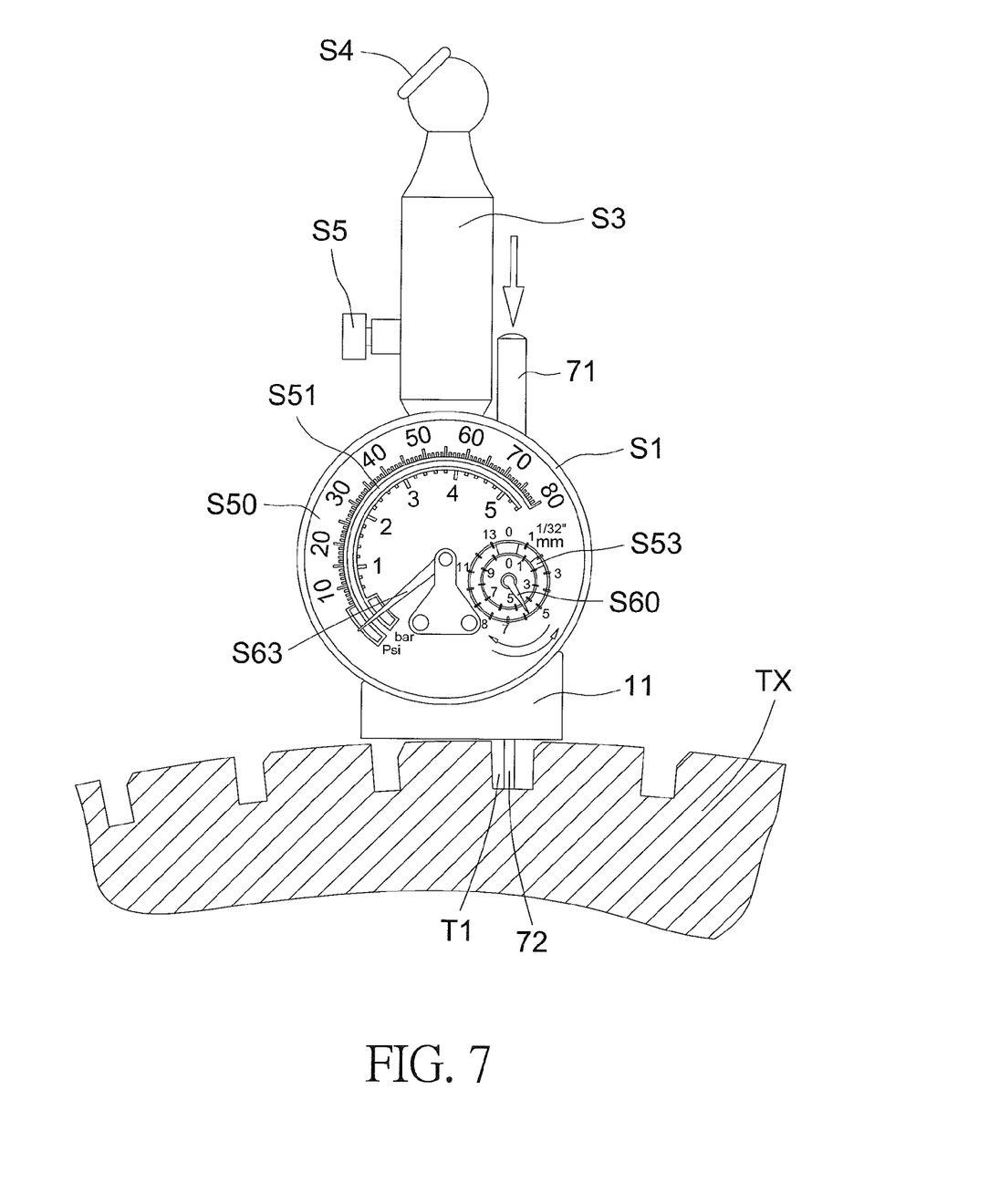
FIG. 7 is a cross sectional view showing the application of the tire pressure gauge according to the preferred embodiment of the present invention.
Figure 8:
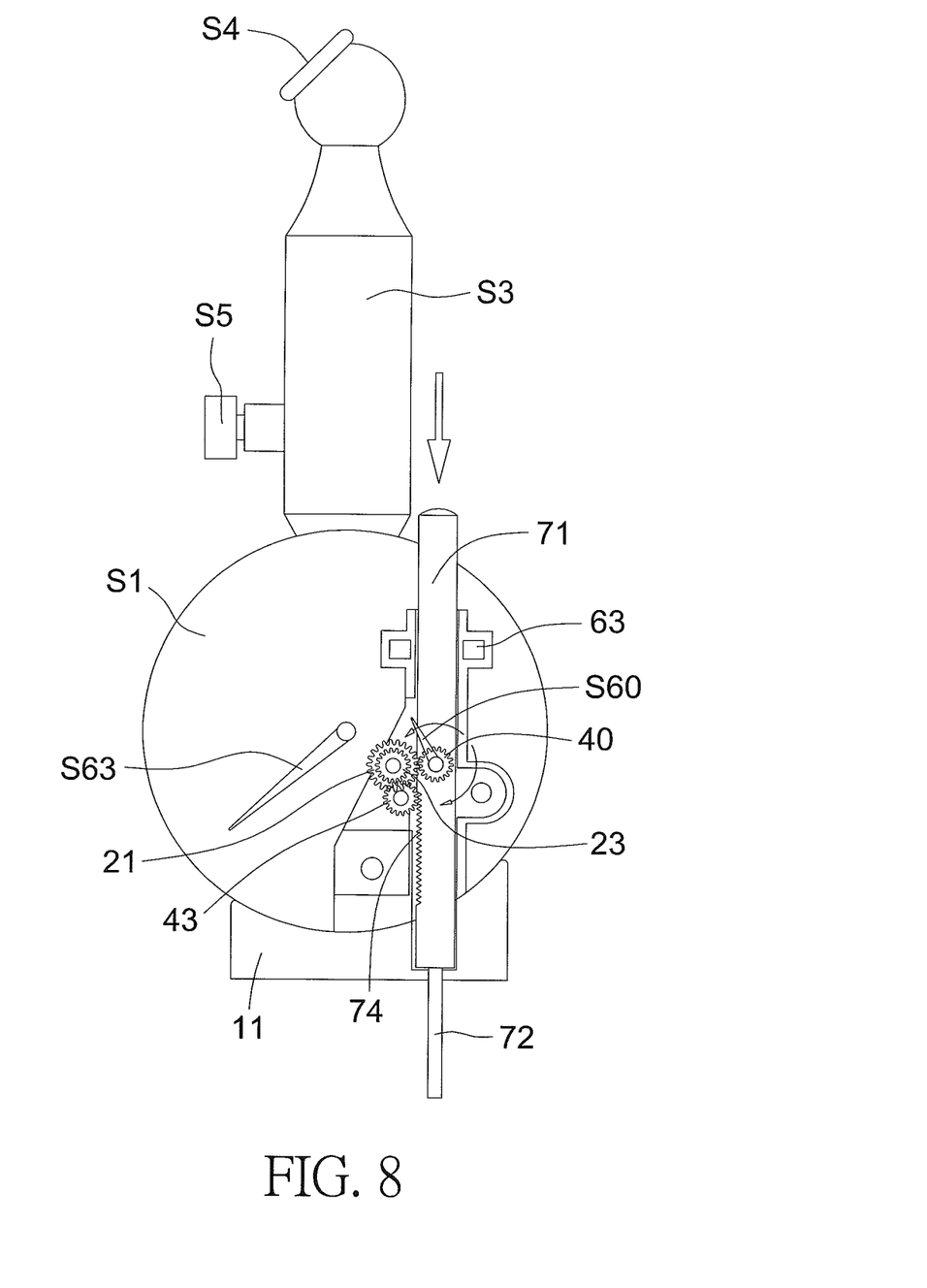
FIG. 8 is a plan side view showing the operation of the tire pressure gauge according to the preferred embodiment of the present invention.
Figure 9:
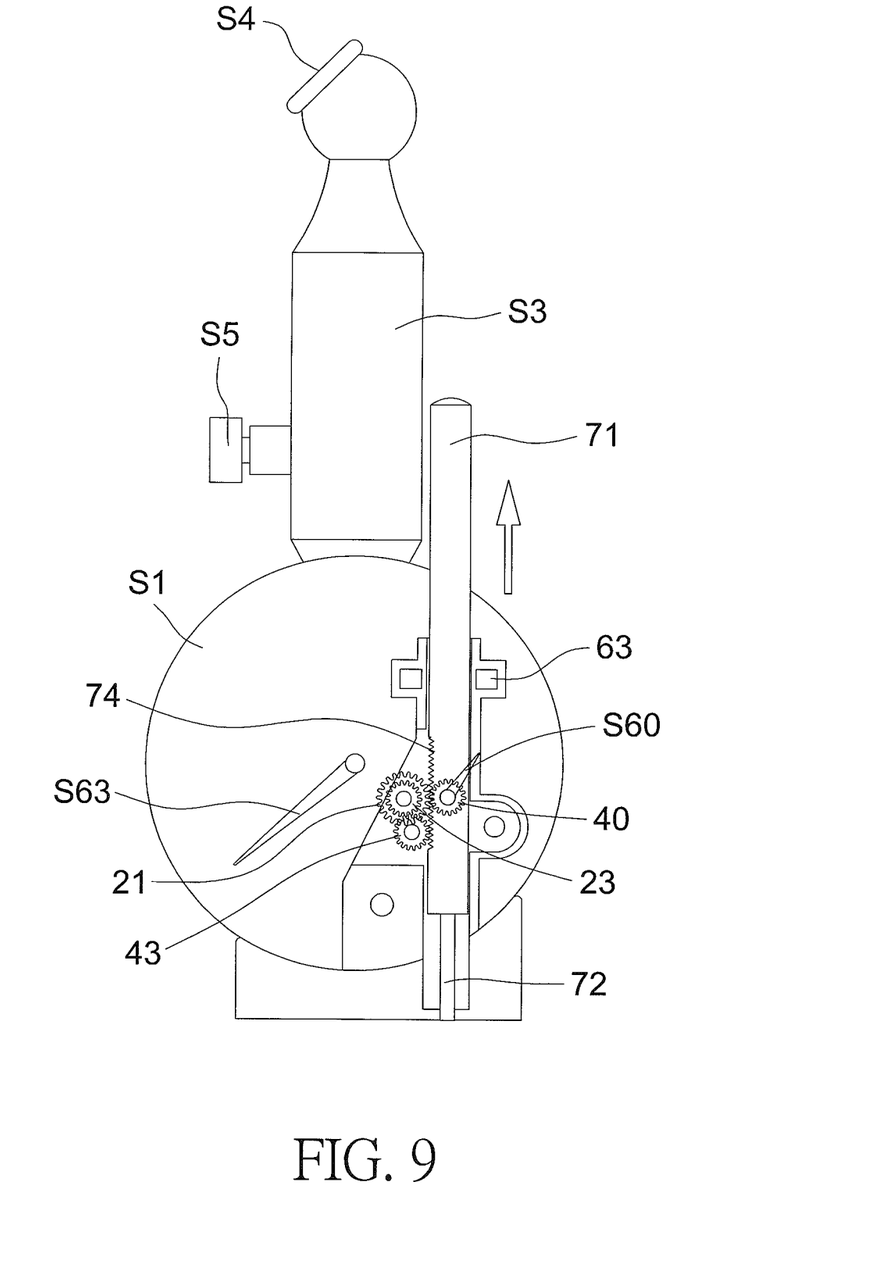
FIG. 9 is another plan side view showing the operation of the tire pressure gauge according to the preferred embodiment of the present invention.
Figure 10:
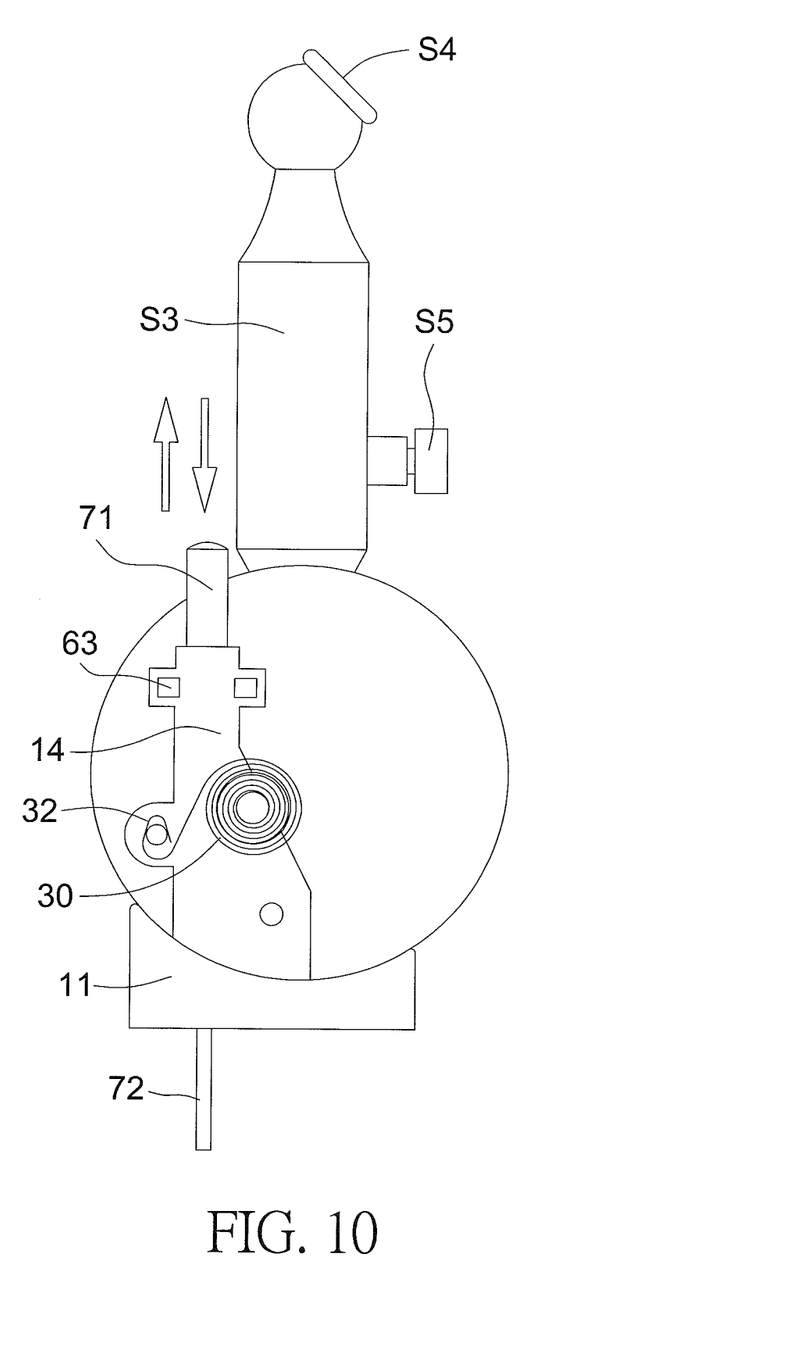
FIG. 10 is also another plan side view showing the operation of the tire pressure gauge according to the preferred embodiment of the present invention.

With reference to FIGS. 1 to 10, a tire pressure gauge according to a preferred embodiment of the present invention comprises a housing S1 in which an open accommodating chamber S6 is defined. The open accommodating chamber S6 has a groove S7 defined around an outer rim thereof relative to the housing S1 and communicating therewith. The open accommodating chamber S6 also has a pressure measuring unit BX disposed therein, and the pressure measuring unit BX has an air guiding device S3, a connecting segment S4, and a pressure relief device S5 which are arranged on an outer wall of the pressure measuring unit BX outside the housing S1. The pressure measuring unit BX further has a numerical display panel S50 mounted on one end surface thereof relative to the housing S1, and the numerical display panel S50 has a tire pressure displaying area S51 and a tire-tread depth displaying area S53. The tire-tread depth displaying area S53 is circular to display a tire-tread depth in a clockwise direction. The groove S7 of the housing S1 has a plurality of first orifices S8 defined on two sides thereof, and the housing S1 further includes a through hole S2 formed on a predetermined position thereof relative to the plurality of first orifices S8. The groove S7 of the housing S1 also has a tire-tread depth measuring unit AX fixed thereon.

The tire-tread depth measuring unit AX contains a mounting assembly 10 including a holder 11, a seat 14 secured on a central position thereof, a first aperture 15 defined on one surface of the seat 14, a second aperture 16 and a third aperture 17 which are defined above the first aperture 15, a vertical slot 12 formed aside the second aperture 16, a fourth aperture 13 defined in the vertical slot 12 relative to the holder 11, a fifth aperture 19 arranged on a predetermined position of one side of the vertical slot 12, and two locking recesses 18 defined aside two sides of a top end of the vertical slot 12.

A gear assembly CX includes a first gear 21, a second gear 23, a third gear 43, a fourth gear 40, a fixing plate 50, a driving member 25, a hair spring 30, and a transmission shaft 27. The fixing plate 50 has a first opening 53 corresponding to the first aperture 15. The second gear 23 has a first opening 24, and the fixing plate 50 has a second opening 51 corresponding to the first opening 24. A first end surface of the first opening 24 aligns with the second opening 51, and a second end surface of the first opening 24 is in alignment with the third aperture 17 of the mounting assembly 10. The third gear 43 has a first connection portion 45 and a second connection portion 44 which extend outwardly from two end surfaces of the third gear 43. The second aperture 16 of the mounting assembly 10 corresponds to the first connection portion 45. The first connection portion 45 is coupled with the second aperture 16, and the fixing plate 50 further has a third opening 52 corresponding to the second connection portion 44. The second connection portion 44 is joined with the third opening 52, and the second gear 23 meshes with the third gear 43. The first gear 21 has a fourth opening 22 defined thereon, and the fourth opening 22 aligns with the second opening 51 of the fixing plate 50. The first gear 21 meshes with the fourth gear 40. The fourth gear 40 has a third connection portion 41 extending outwardly from one end surface thereof, and the hair spring 30 is in a spiral shape. The hair spring 30 has a first joining segment 31 formed adjacent to a central position thereof, and the first joining segment 31 aligns with the third aperture 17 of the mounting assembly 10. The hair spring 30 also has a second joining segment 32 extending outwardly opposite to the first joining segment 31 to connect at a predetermined position of a back surface of the mounting assembly 10. The driving member 25 has a first pore 26 formed on a central position thereof to align with the first joining segment 31 of the hair spring 30. The transmission shaft 27 inserts through the fourth opening 22 of the first gear 21, the second opening 51 of the fixing plate 50, the third aperture 17 of the mounting assembly 10, the first joining segment 31 of the hair spring 30, and the first pore 26 of the driving member 25. A distal end of the transmission shaft 27 abuts against and connects with the first gear 21, the fixing plate 50, the second gear 23, the hair spring 30, and the driving member 25. Hence the first gear 21, the fixing plate 50, the second gear 23, the hair spring 30, and the driving member 25 are driven by the transmission shaft 27 simultaneously. The third connection portion 41 of the fourth gear 40 has an indication portion 42 arranged on a central position of an outer edge thereof and fixed in the tire-tread depth displaying area S53 of the numerical display panel S50.

A damping washer 55 is mounted in the fifth aperture 19 of the mounting assembly 10 by inserting a first screw 54 in the fifth aperture 19 of the mounting assembly 10.

A longitudinal post 70 is vertically connected with the vertical slot 12 of the mounting assembly 10 and includes a slidable rack 71 arranged on a top end thereof. The slidable rack 71 extends out of the through hole S2 of the housing S1. The longitudinal post 70 also includes a flat portion 73 formed on a predetermined zone of a front end surface thereof, and the flat portion 73 has a meshing rack 74 fixed on one side thereof to correspond to the third gear 43. The meshing rack 74 meshes with the third gear 43, and the longitudinal post 70 further includes a measurement stem 72 secured on a distal end thereof and downwardly extending out of the fourth aperture 13 of the mounting assembly 10.

A covering lid 60 includes a first ventilation 61 aligning with the fixing plate 50 and the first aperture 15 of the mounting assembly 10. A second screw 64 is inserted through the first ventilation 61 to screw with the first aperture 15 of the mounting assembly 10. The covering lid 60 also includes a second ventilation 62 defined thereon to correspond to the third connection portion 41 of the fourth gear 40. The third connection portion 41 of the fourth gear 40 is connected with the second ventilation 62 of the covering lid 60, and the covering lid 60 further includes two tenons 63 formed thereon to correspond to the two locking recesses 18 of the mounting assembly 10.

The pressure measuring unit BX further includes a guide mount S20, and the guide mount S20 has an air vent S21 defined on a central position thereof and has a film S30 mounted on a front end thereof. A positioning loop S40 is covered on two outer rims of the guide mount S20 and the film S30. The positioning loop S40 has a square orifice S41 formed thereon, and the film S30 has a first shank S59 inserted on a central position thereof. The tire pressure displaying area S51 of the numerical display panel S50 has a second pore S52 defined on a central position thereof. The first shank S59 extends out of an affix portion S56 of a connector S55 via the second pore S52, and a first coupling segment S64 of a first pointer S63 is coupled with a distal end of the first shank S59. Hence, the first pointer S63 and the first shank S59 are driven to rotate simultaneously, and the connector S55 has plural securing portions S57 arranged on predetermined positions thereof. The numerical display panel S50 further has a third pore S62 to correspond to one of the plural securing portions S57 and the third pore S62 is coupled with the one of the plural securing portions S57. The indication portion 42 of the fourth gear 40 of the gear assembly CX has a second shank S58, and the tire-tread depth displaying area S53 of the numerical display panel S50 has a third pore S54 arranged on a central position thereof. After the second shank S58 extends out of the third pore S54, the first shank S59 extends out of the affix portion S56 and is further connected with a second coupling segment S61 of a second pointer S60, and the second coupling segment S61 of the second pointer S60 is joined with a distal end of the second shank S58. Hence the second pointer S60 and the second shank S58 are driven to rotate simultaneously. In addition, the numerical display panel S50 further has a collar S70 retained around an outer peripheral side thereof relative to the housing S1, and the collar S70 has a plastic ring S90 fitted on an outer peripheral side thereof. A transparent piece S80 is defined between the plastic ring S90 and the collar S70. The groove S7 of the housing S1 has the plurality of first orifices S8 defined on the two side thereof, and the holder 11 of the tire-tread depth measuring unit AX has plural second orifices 101 to correspond to the plurality of first orifices S8 of the holder 11. Plural lock elements SX are screwed with the plural second orifices 101 and the plurality of first orifices S8 to fix the tire-tread depth measuring unit AX in the housing S1.

In operation, the slidable rack 71 of the longitudinal post 70 is pressed so that the measurement stem 72 extends out of the mounting assembly 10 and a bottom end of the housing S1. The measurement stem 72 is inserted into a tread slit T1 of a tire TX to measure the tire-tread depth, and the meshing rack 74 of the longitudinal post 70 meshes with the third gear 43. When the third gear 43 rotates, it drives the second gear 23 and the first gear 21 to rotate, and the first gear 21 drives the fourth gear 40 to revolve. The fourth gear 40 drives the second shank S58 and the second pointer S60 to rotate. Hence, a longitudinal movement of the longitudinal post 70 is transformed into circumference rotation data through the gear assembly CX, and the circumference rotation data is displayed and is viewed by a user by ways of a numerical scale of the tire-tread depth displaying area S53. Accordingly, when a depth of the tread slit T1 of the tire TX is measured too shallow, the second pointer S60 points toward a warning position to remind the user to replace the tire TX. After measuring the tire-tread depth and desiring to store the tire pressure gauge, the first joining segment 31 of the hair spring 30 of the second gear 23 and the first gear 21 returns back to the original position. The first gear 21 and the second gear 23 returns to a zero state, and the second gear 23 meshes with the third gear 43, so that the slidable rack 71 of the longitudinal post 70 and the measurement stem 72 upwardly move to original positions. The first gear 21 meshes with the fourth gear 40, so that the second pointer S60 moves back to an zero position opposite to the tire-tread depth displaying area S53.

Thereby, The tire pressure gauge of the present invention measures a tire pressure and the tire-tread depth. The tire-tread depth measuring unit indicates a number of the tire-tread depth by using the second pointer, after the measurement stem of the longitudinal post is inserted into the tread slit of the tire TX, and the longitudinal movement of the longitudinal post is transformed into the circumference rotation data through the gear assembly, thus indicating the number of the tire-tread depth on the numerical display panel clearly. Preferably, a probe and the measurement stem of the longitudinal post inserted into the tread slit are driven by the hair spring to return the zero state.

While various embodiments in accordance with the present invention have been shown and described, it is clear to those skilled in the art that further embodiments may be made without departing from the scope of the present invention.

What is claimed is:

1. A tire pressure gauge comprising:
a housing in which an open accommodating chamber is defined, with the open accommodating chamber having a groove defined around an outer rim thereof relative to the housing and communicating therewith, wherein the open accommodating chamber also has a pressure measuring unit disposed therein, wherein the pressure measuring unit has an air guiding device opposite to the housing, wherein the pressure measuring unit further has a numerical display panel mounted on one end surface thereof relative to the housing, wherein the numerical display panel has a tire pressure displaying area and a tire-tread depth displaying area, wherein the tire-tread depth displaying area is circular to display a tire-tread depth in a clockwise direction; wherein the groove of the housing has a plurality of first orifices defined on two sides thereof, wherein the housing further includes a through hole formed on a predetermined position thereof relative to the plurality of first orifices; wherein the groove of the housing also has a tire-tread depth measuring unit fixed thereon, wherein the tire-tread depth measuring unit contains:

a mounting assembly including a holder, a seat secured on a central position thereof, a first aperture defined on one surface of the seat, a second aperture and a third aperture which are defined above the first aperture, a vertical slot formed aside the second aperture, a fourth aperture defined in the vertical slot relative to the holder, a fifth aperture arranged on a predetermined position of one side of the vertical slot, and two locking recesses defined aside two sides of a top end of the vertical slot;

a gear assembly including a first gear, a second gear, a third gear, a fourth gear, a fixing plate, a driving member, a hair spring and a transmission shaft, wherein the second gear has a first opening, wherein the fixing plate has a second opening corresponding to the first opening, wherein a first end surface of the first opening aligns with the second opening, wherein a second end surface of the first opening is in alignment with the third aperture of the mounting assembly, wherein the third gear has a first connection portion and a second connection portion which extend outwardly from two end surfaces of the third gear, wherein the second aperture of the mounting assembly corresponds to the first connection portion, wherein the first connection portion is coupled with the second aperture, wherein the fixing plate further has a third opening corresponding to the second connection portion, wherein the second connection portion is joined with the third opening, wherein the second gear meshes with the third gear, wherein the first gear has a fourth opening defined thereon, wherein the fourth opening aligns with the second opening of the fixing plate, wherein the first gear meshes with the fourth gear, wherein the fourth gear has a third connection portion extending outwardly from one end surface thereof, wherein the hair spring is in a spiral shape, wherein the hair spring has a first joining segment formed adjacent to a central position thereof, wherein the first joining segment aligns with the third aperture of the mounting assembly, wherein the hair spring also has a second joining segment extending outwardly opposite to the first joining segment to connect at a predetermined position of a back surface of the mounting assembly, wherein the driving member has a first pore formed on a central position thereof to align with the first joining segment of the hair spring, wherein the transmission shaft inserts through the fourth opening of the first gear, the second opening of the fixing plate, the third aperture of the mounting assembly, the first joining segment of the hair spring, and the first pore of the driving member, wherein a distal end of the transmission shaft abuts against and connects with the first gear, the fixing plate, the second gear, the hair spring, and the driving member, wherein the first gear, the fixing plate, the second gear, the hair spring, and the driving member are driven by the transmission shaft simultaneously; wherein the third connection portion of the fourth gear has an indication portion arranged on a central position of an outer edge thereof and fixed in the tire-tread depth displaying area of the numerical display panel;

a damping washer mounted in the fifth aperture of the mounting assembly by inserting a first screw in the fifth aperture of the mounting assembly;

a longitudinal post vertically connected with the vertical slot of the mounting assembly and including a slidable rack arranged on a top end thereof, wherein the slidable rack extends out of the through hole of the housing, with the longitudinal post also including a flat portion formed on a predetermined zone of a front end surface thereof, and with the flat portion having a meshing rack fixed on one side thereof to correspond to the third gear, wherein the meshing rack meshes with the third gear, with the longitudinal post further including a measurement stem secured on a distal end thereof and downwardly extending out of the fourth aperture of the mounting assembly; and a covering lid including a first ventilation aligning with the fixing plate and the first aperture of the mounting assembly, wherein a second screw is inserted through the first ventilation to screw with the first aperture of the mounting assembly, with the covering lid also including a second ventilation defined thereon to correspond to the third connection portion of the fourth gear, wherein the third connection portion of the fourth gear is connected with the second ventilation of the covering lid, and with the covering lid further including two tenons formed thereon to correspond to the two locking recesses of the mounting assembly.

2. The tire pressure gauge as claimed in claim 1, wherein the pressure measuring unit further includes a guide mount, wherein the guide mount has an air vent defined on a central position thereof and has a film disposed mounted on a front end thereof, wherein a positioning loop is covered on two outer rims of the guide mount and the film, wherein the positioning loop has a square orifice formed thereon, wherein the film has a first shank inserted on a central position thereof, wherein the tire pressure displaying area, of the numerical display panel has a second pore defined on a central position thereof, wherein the first shank extends out of an affix portion of a connector via the second pore, wherein a first coupling segment of a first pointer is coupled with a distal end of the first shank, wherein the first pointer and the first shank are driven to rotate simultaneously, wherein the connector has plural securing portions arranged on predetermined positions thereof, wherein the numerical display panel further has a third pore to correspond to one of the plural securing portions, wherein the third pore is coupled with the one of the plural securing portions; the indication portion of the fourth gear of the gear assembly has a second shank, wherein the tire-tread depth displaying area of the numerical display panel has a third pore arranged on a central position thereof, wherein after the second shank extends out of the third pore, the first shank extends out of the affix portion and is further connected with a second coupling segment of a second pointer, and the second coupling segment of the second pointer is joined with a distal end of the second shank, wherein the second pointer and the second shank are driven to rotate simultaneously; wherein the numerical display panel further has a collar retained around an outer peripheral side thereof relative to the housing, wherein the collar has a plastic ring fitted on an outer peripheral side thereof, and wherein a transparent piece is defined between the plastic ring and the collar.

3. The tire pressure gauge as claimed in claim 1, wherein the groove of the housing has the plurality of first orifices defined on the two sides thereof, wherein the holder of the tire-tread depth measuring unit has plural second orifices to correspond to the plurality of first orifices of the holder, and wherein plural lock elements are screwed with the plural second orifices and the plurality of first orifices to fix the tire-tread depth measuring unit in the housing.

* * * * *